(12) United States Patent
Folea et al.

(10) Patent No.: US 10,269,086 B2
(45) Date of Patent: Apr. 23, 2019

(54) METHOD AND SYSTEM FOR SECURE SHARING OF RECORDED COPIES OF A MULTICAST AUDIOVISUAL PROGRAM USING SCRAMBLING AND WATERMARKING TECHNIQUES

(75) Inventors: Octavian Folea, Le Kremlin-Bicêtre (FR); Didier Lesteven, Draveil (FR)

(73) Assignee: NAGRA FRANCE SAS, Paris (FR)

( * ) Notice: Subject to any disclaimer, the term of this patent is extended or adjusted under 35 U.S.C. 154(b) by 2078 days.

(21) Appl. No.: 12/248,437

(22) Filed: Oct. 9, 2008

(65) Prior Publication Data

US 2010/0092025 A1    Apr. 15, 2010

(51) Int. Cl.
| | | |
|---|---|---|
| G06T 1/00 | (2006.01) | |
| H04L 29/06 | (2006.01) | |
| H04N 7/167 | (2011.01) | |
| H04N 21/8358 | (2011.01) | |

(52) U.S. Cl.
CPC .......... *G06T 1/0071* (2013.01); *H04L 63/166* (2013.01); *H04N 7/1675* (2013.01); *H04N 21/8358* (2013.01); *H04L 65/4076* (2013.01); *H04L 2463/103* (2013.01)

(58) Field of Classification Search
CPC . G06T 1/0071; H04L 63/166; H04L 65/4076; H04L 2463/103; H04N 7/1675; H04N 21/8358
USPC .......................................................... 705/51
See application file for complete search history.

(56) References Cited

U.S. PATENT DOCUMENTS

| | | | | |
|---|---|---|---|---|
| 6,285,774 | B1 * | 9/2001 | Schumann | H04N 5/913 |
| | | | | 375/E7.026 |
| 7,962,964 | B2 * | 6/2011 | Stone | G06F 21/10 |
| | | | | 380/201 |
| 2002/0080964 | A1 | 6/2002 | Stone et al. | |
| 2005/0289064 | A1 | 12/2005 | LeComte et al. | |
| 2006/0164544 | A1 * | 7/2006 | Lecomte | H04N 7/1675 |
| | | | | 348/390.1 |
| 2008/0085031 | A1 * | 4/2008 | Estevez | G06F 21/10 |
| | | | | 382/100 |
| 2008/0304810 | A1 * | 12/2008 | Rijckaert | H04N 5/783 |
| | | | | 386/344 |
| 2010/0128871 | A1 * | 5/2010 | Folea | H04N 7/167 |
| | | | | 380/210 |

FOREIGN PATENT DOCUMENTS

| | | | | |
|---|---|---|---|---|
| KR | 10-2002-0022131 | | 3/2002 | |
| WO | WO99/65241 | * | 12/1999 | ............. H04N 5/913 |

OTHER PUBLICATIONS

ETR 289, "Digital Video Broadcasting (DVB); Support for use of scrambling and Conditional Access (CA) within digital broadcasting system", European Telecommunications Standards Institute (ETSI), Oct. 1996, 13 pages.*

(Continued)

*Primary Examiner* — James D Nigh
(74) *Attorney, Agent, or Firm* — Oblon, McClelland, Maier & Neustadt, L.L.P.

(57) ABSTRACT

A thin high strength steel sheet having excellent formability has a composition which includes, by mass %, 0.08 to 0.15% of C, 0.5 to 1.5% of Si, 0.5 to 1.5% of Mn, 0.01 to 0.1% of Al, and 0.005% or less of N.

26 Claims, 8 Drawing Sheets

(56) References Cited

OTHER PUBLICATIONS

ETR 289, "Digital Video Broadcasting (DVB); Support for use of scrambling and Conditional Access (CA) within digital broadcasting system", European Telecommunications Standards Institute (ETSI), Oct. 1996, 13 pages (Year: 1996).*
English translation of Notice of Request for Submission of Argument dated Jul. 1, 2015 of corresponding Korean Application No. 10-2011-7010026.

* cited by examiner

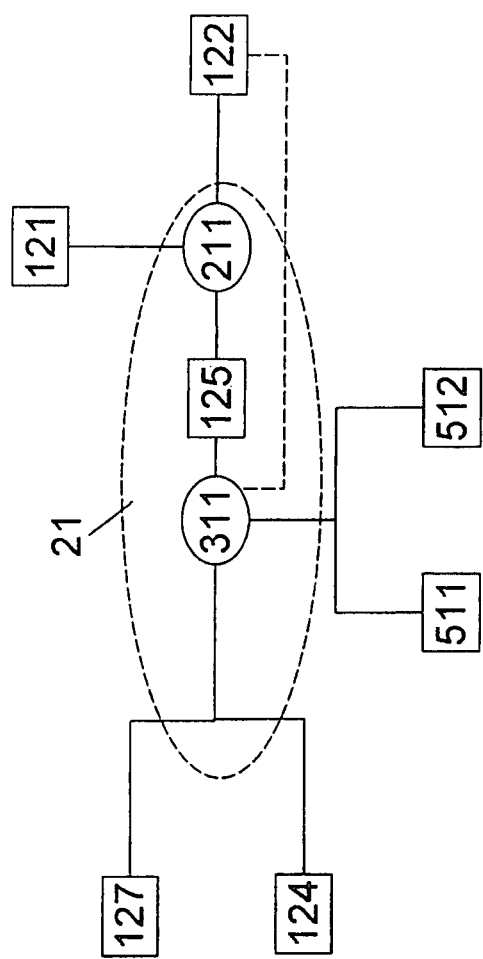

METHOD AND SYSTEM FOR SECURE SHARING OF RECORDED COPIES OF A MULTICAST AUDIOVISUAL PROGRAM USING SCRAMBLING AND WATERMARKING TECHNIQUES

TECHNICAL FIELD

This disclosure generally relates to a secure distribution of multimedia content, more specifically to a method and system for secure sharing among various personal user devices of recorded copies of a multicast audiovisual program, the legal consumption of the recoded audiovisual program being guaranteed by an innovative approach using scrambling and watermarking techniques.

BACKGROUND

Increasing deployment of digital television (satellite, cable and radio broadcast, as well as more recently IP multicast) provides more flexible content consumption on client side. Consumers may record television programs to watch them later to the diffusion time, or to make permanent private copies that can be used on any of their personal home devices. Sharing these copies with family or friends is another feature highly demanded by the digital TV subscribers.

However, these new services must guarantee the rights granted by the content owners or the service providers, as well as it must prevent any illegal usage and identify the successful hacking attempts.

To securely implement this kind of system, various technologies are known by the skilled man.

DTCP (Digital Transmission Content Protection) is a technical specification for copy protection of copyrighted content that is transferred over digital interfaces to personal home devices. Under this specification, digital content can be shared securely between devices in a user's home but not shared with third-parties outside the home network. Using an authentication scheme, DTCP allows the user to designate devices in the home network as trusted destinations that can transfer data back and forth.

However, the disadvantage of this technology is that a malicious user may circumvent the DTCP security measures by designing a "fake" device as being part of his home network and to use it not only to illicitly consume the content, but even worse, to illegal distribute the content.

Another disadvantage is that DTCP specifies that the content should be encrypted before being transmitted to other personal home devices. This requires more expensive personal home devices, so limiting the deployment of such a system.

CPCM (Content Protection and copy Management) is a part of DVB (Digital Video Broadcast) specification. CPCM addresses the protection of audiovisual content after it has been received by a consumer device. Once the audiovisual content is received by a CPCM-compliant device, it is protected by various cryptographic techniques and a license containing the consumption rights is bound to protected content. Therefore, the protected content can be rendered by other CPCM-compliant devices, with respect to the usage rights stored within the content.

While being two different technologies (CPCM is focusing on content protection and DTCP on transport link protection), CPCM suffers from the same disadvantages than DTCP: no possibility to identify the successful hacking attempts and complex and costly home devices to be deployed.

It could be helpful to resolve these disadvantages by marking the content with unique marks for every consuming devices to allow a later identification of eventual hacking attempts, while proposing a simpler protection system that requires a unique operation of content protection applied only once on the server side.

SUMMARY

A method is provided for the secure distribution of an original audiovisual stream to a plurality of consumer devices through a multicast session, the method comprising the steps of generating:
  a protected audiovisual stream by modifying the original audiovisual stream;
  a complementary stream of any format comprising digital information suitable to allow reconstruction of an audiovisual stream from the protected stream;
and the steps of:
  calculating a first mark as function of a unique identifier of a receiving consumer device or an external secure device;
  calculating on the receiving consumer device a first marked audiovisual stream from the protected stream as function of the first mark and the complementary stream;
  transmitting the protected stream from the receiving device to the second device;
  calculating a second mark as function of a unique identifier of a second device, an external secure device or a consumer using the second device;
  calculating on the second consumer device a second marked audiovisual stream from the protected stream received from the receiving device as function of the second mark.

According to particular aspects:
  to generate the protected audiovisual stream uses cryptographic algorithms;
  to generate the protected audiovisual stream uses the specifications DVB-CA;
  the protected stream has the same format as the original stream;
  to generate the protected audiovisual stream comprises replacing at least one part of the original audiovisual stream with different data in the protected audiovisual stream and storing the replaced parts within the complementary stream;
  to calculate the first or the second marked audiovisual stream comprises the steps of:
    descrambling the protected audiovisual stream using the information contained in the complementary stream by generating a clear content stream with similar visual and audible representation as the original content;
    generating the first or second marked audiovisual stream by marking the clear content stream in function of the first mark or the second mark respectively;
  to calculate the first or second marked audiovisual stream comprises the steps of:
    generating a marked complementary stream by marking the complementary stream using the first mark or the second mark respectively;

generating the first or second marked audiovisual stream by descrambling the protected content stream using the information contained in the marked complementary stream;

to generate the marked complementary stream is done on a remote server and the marked complementary stream is transmitted from the remote server to the second device;

the complementary stream is transmitted from the receiving device to the second device using a direct-connection link;

the complementary stream is transmitted from the receiving device to the second device using an external secure device;

the complementary stream is transmitted from a remote to the second device using a network connection;

the first mark is generated by the receiving device;

the first mark is generated on an external secure device and transmitted to the receiving device using a direct-connection link;

the second mark is generated on the receiving device transmitted to the second device using a direct-connection link;

the second mark is generated on the receiving device transmitted to the second device using an external secure device;

the second mark is generated on an external secure device and transmitted to the second device using a direct-connection link;

the second mark is generated on the second device;

the transmission and/or storage of the complementary stream is protected by cryptographic means, and the transmission and/or storage of the marked complementary stream is protected by cryptographic means.

We also provide a device comprising:

means to generate a protected audiovisual stream by modifying the original audiovisual stream;

means to generate a complementary stream of any format comprising digital information suitable to allow reconstruction of an audiovisual stream from the protected stream;

means to calculate a first mark as function of a unique identifier of a receiving consumer device or an external secure device;

means to calculate on the receiving consumer device a first marked audiovisual stream from the protected stream as function of the first mark and the complementary stream;

means to transmit the protected stream from the receiving device to the second device;

means to calculate a second mark as function of a unique identifier of a second device, an external secure device or a consumer using the second device;

means to calculate on a second consumer device a second marked audiovisual stream from the protected stream received from the receiving device as function of the second mark.

According to particular aspects:

the system comprises cryptographic means to generate the protected audiovisual stream;

the system comprises means to replace at least one part of the original audiovisual stream with different data in the protected audiovisual stream and means to store the replaced parts within the complementary stream;

the system comprises:
means to descramble the protected audiovisual stream using the information contained in the complementary stream by generating a clear content stream with similar visual and audible representation as the original content;
means to generate the first or second marked audiovisual stream by marking the clear content stream in function of the first or second mark, respectively;

the system comprises:
means to generate a marked complementary stream by marking the complementary stream using the first or second mark, respectively;
means to generate the first or second marked audiovisual stream by descrambling the protected content stream using the information contained in the marked complementary stream;

system comprises means to generate the marked complementary stream and to transmit it to the second device;

system comprises means an external secure device to transmit the complementary stream from the receiving device to the second device;

system comprises a remote server to transmit the complementary stream to the second device;

system comprises an external secure device to generate/store the first or second mark;

system comprises an external secure device to transmit/store the first or second mark to the receiving device or to the second device, respectively;

the receiving device is a computer, a set-top-box, a media center, a mobile phone, a PDA, a portable media player or any other hardware device with multimedia capabilities;

the device is a computer, a set-top-box, a media center, a mobile phone, a PDA, a portable media player or any other hardware device with multimedia capabilities;

the external secure device is a SIM card, secure USB device or any other secure hardware/software component capable to securely store and transmit a unique identifier; and a USB connection, a wireless network, a wired network, an external hard-disk, a flash disk, an USB key or a CD/DVD devices to allow the transfer of the protected audiovisual stream and/or the complementary stream.

BRIEF DESCRIPTION OF THE DRAWINGS

The above described aspects will become more apparent by describing in detail examples thereof with reference to the attached drawing figures, wherein:

FIGS. 3A, 3B and 3C detail the descrambling module situated on client side for the multicast systems presented in FIGS. 2A, 2B and 2C.

DETAILED DESCRIPTION

Hereinafter, certain representative examples will be described in detail with reference to the accompanying drawing figures.

In the following description, the matters defined in the description such as a detailed construction and elements are provided to assist in a comprehensive understanding of the disclosure. Thus, it is apparent that our methods and systems can be carried out without those defined matters. Also, well-known functions or constructions are not described in detail since they would obscure the systems and methods in unnecessary detail.

In addition, identical references within the accompanying drawing figures address similar technical elements, unless a different meaning is clearly described.

Figure 1A:
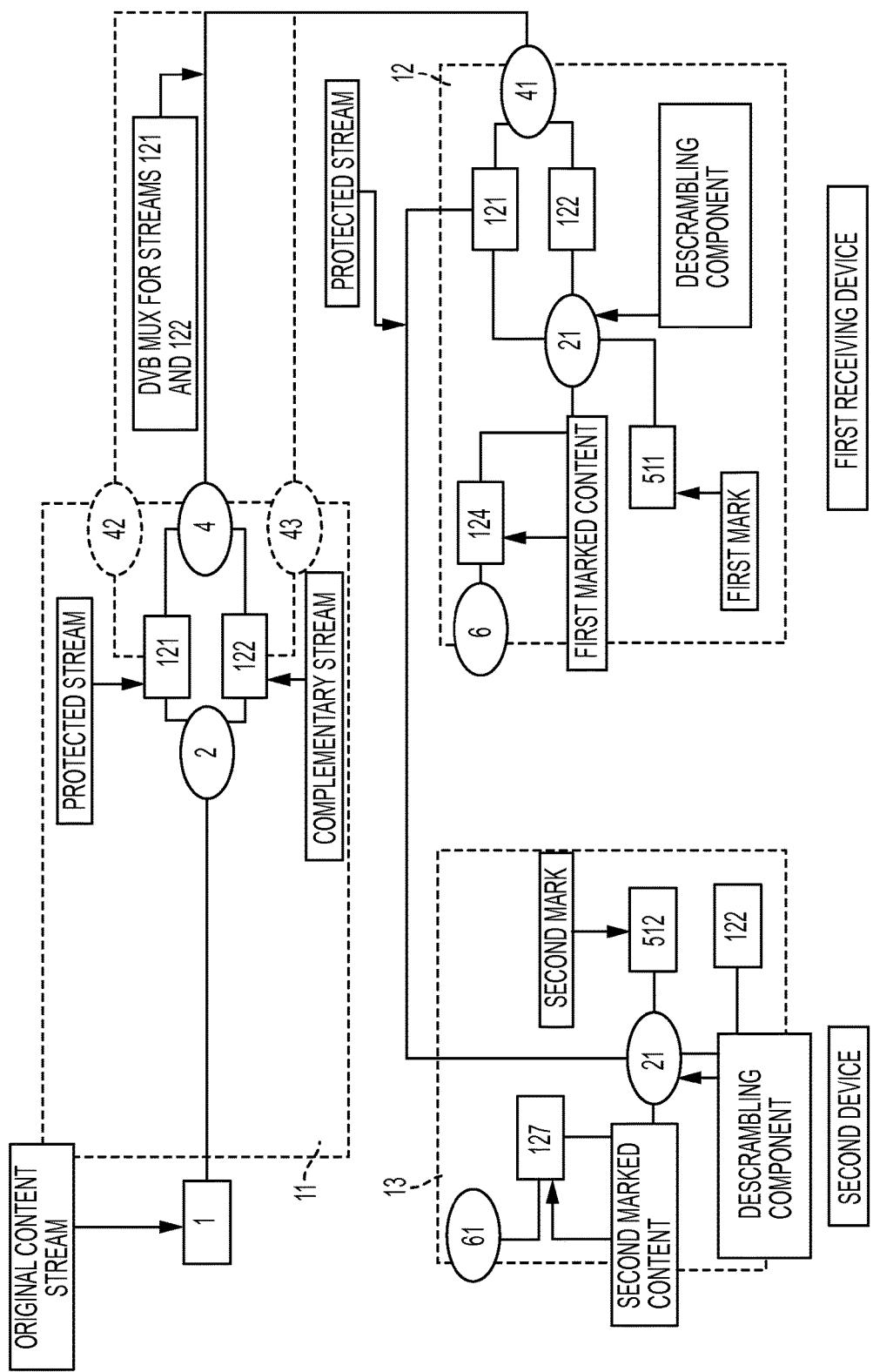
FIGS. 1A and 1B show the detailed server side of a multicast system to securely deliver multimedia content.

FIG. 1A is a structured view of a protection system comprising: a multicast content distribution server 11, a receiving device 12 to playback the content distributed by the server 11 and a second device 13 to playback the content transmitted by the receiving device 12.

The multicast content distribution server 11 has two main functions: to protect the input content and to send it to dynamic user group by broadcast techniques.

The original content stream 1 is a multimedia stream containing video and audio flows, as well as rich media flows.

The audiovisual compression methods are the ones well known such as the standard ones: MPEG-2, MPEG-4 part 2, MPEG-4 AVC/H.264, MPEG-4 SVC etc. or the ones largely used by industry: Windows Media Audio and Video, VP6 and the like.

The structure of the original content stream 1, as well as all the other mechanisms allowing mixing various audio and visual streams and signaling of codec types, stream types and private data, are standard: MPEG-2 TS, MP4 file format etc. or proprietary: FLV (Flash Video) file format, ASF (Advanced Systems Format) file format and the like.

The original content stream 1 is scrambled by a scrambling module 2 that generates as output a protected stream 121 and a complementary stream 122 that comprises the information needed by a descrambling component 21 to generate marked contents 124 and 127 from the protected stream 121 in function of a first mark 511, respectively, a second mark 512.

The format of the complementary stream 122 can either be proprietary, either standard, for example, of the same standard as the format of the protected stream 121.

According to one aspect, the protected stream 121 and the complementary stream 122 are generated by the scrambling module 2 by using various cryptographic mechanisms known in the art as, for example, the specifications Digital Video Broadcast (see ETR 289).

According to one aspect, the technique that allows the protected stream to have the same format as the original stream, is to exploit different parameters of the audiovisual standards that would impose to a decoder to skip (so not to decode) the modified data contained within the protected stream. For example, for the video data encoded further to H.264 standard, a modified NALU that is a part of the protected stream is skipped by a standard decoder if the value of the NALU_type field is set to 0 or starting with 24 to 31. Skipping the modified NALU of the protected stream allows the user to have access to a degraded representation of the protected content (as only the unmodified NALU will be decoded), that will not allow to the user to consume it, but that will prompt the user to purchase the content to visualize with a proper quality.

According to another aspect, the protected stream 121 and the complementary stream 122 are generated by the scrambling module 2 by replacing some parts of the original content stream 1 with different data and thus generating the protected stream content compliant with the format of the original content stream 1, and storing the original replaced parts within the complementary stream 122. This method is described in various documents, e.g., WO 2005/032135, the subject matter of which is incorporated herein by reference.

According to one aspect, the generated streams 121 and 122 are distributed to a dynamic group of receivers by transmission device 4 using one multicast session for both streams.

According to one aspect, the transmission device 4 integrates DVB MUX functions to multiplex and/or transmit the generated streams 121 and 122.

According to another aspect, the generated streams 121 and 122 are distributed to a dynamic group of receivers by transmission device 42 and respectively 43 using separate multicast sessions for each stream.

According to one aspect, the transmission devices 43 and/or 42 integrate DVB MUX functions to multiplex and/or transmit the generated streams 121 and 122.

According to one aspect, the transmission of the complementary stream 122 is protected by various well known cryptographic means. For example, the complementary stream 122 is protected implementing the specifications DVB-CA (see ETR 289).

On the client side, the receiving device 12 get the protected stream 121 and the complementary stream 122 through the network interface 41.

The receiving device 12 is a computer, a set-top-box, a media center, a mobile phone, a PDA, a portable media player or any other hardware device with multimedia capabilities.

The network interface 41 is an IP (Internet Protocol), cable, terrestrial, satellite or mobile network interface, depending on which kind of network the two streams are transmitted.

The two streams are then processed by the descrambling module 21 to generate the first marked content 124 in function of a first mark 511. The functions of the descrambling module 21 will be described later (FIG. 3A).

The first marked content 124 is then transmitted to the multimedia decoding interface 6 for decoding and rendering.

The multimedia decoding interface 6 is a software/hardware module performing audiovisual decoding, a multimedia player or an external device with various capabilities in terms of multimedia decoding and rendering.

The protected content 121 is transmitted from receiving device 12 to the second device 13 by direct-connection (e.g., USB connection), network transport (e.g., wireless or wired) or external storage medium (e.g., external hard-disk, flash disk, USB key or CD/DVD).

The second device 13 is a computer, a set-top-box, a media center, a mobile phone, a PDA, a portable media player or any other hardware device with multimedia capabilities.

On the second device 13, the protected content 121 and the complementary stream 122 are then processed by the descrambling module 21 to generate the second marked content 127 in function of a second mark 512.

The second marked content 127 is then transmitted to the multimedia decoding interface 61 for decoding and rendering.

The multimedia decoding interface 61 is a software/hardware module performing audiovisual decoding, a multimedia player or an external device with various capabilities in terms of multimedia decoding and rendering.

Figure 1B:
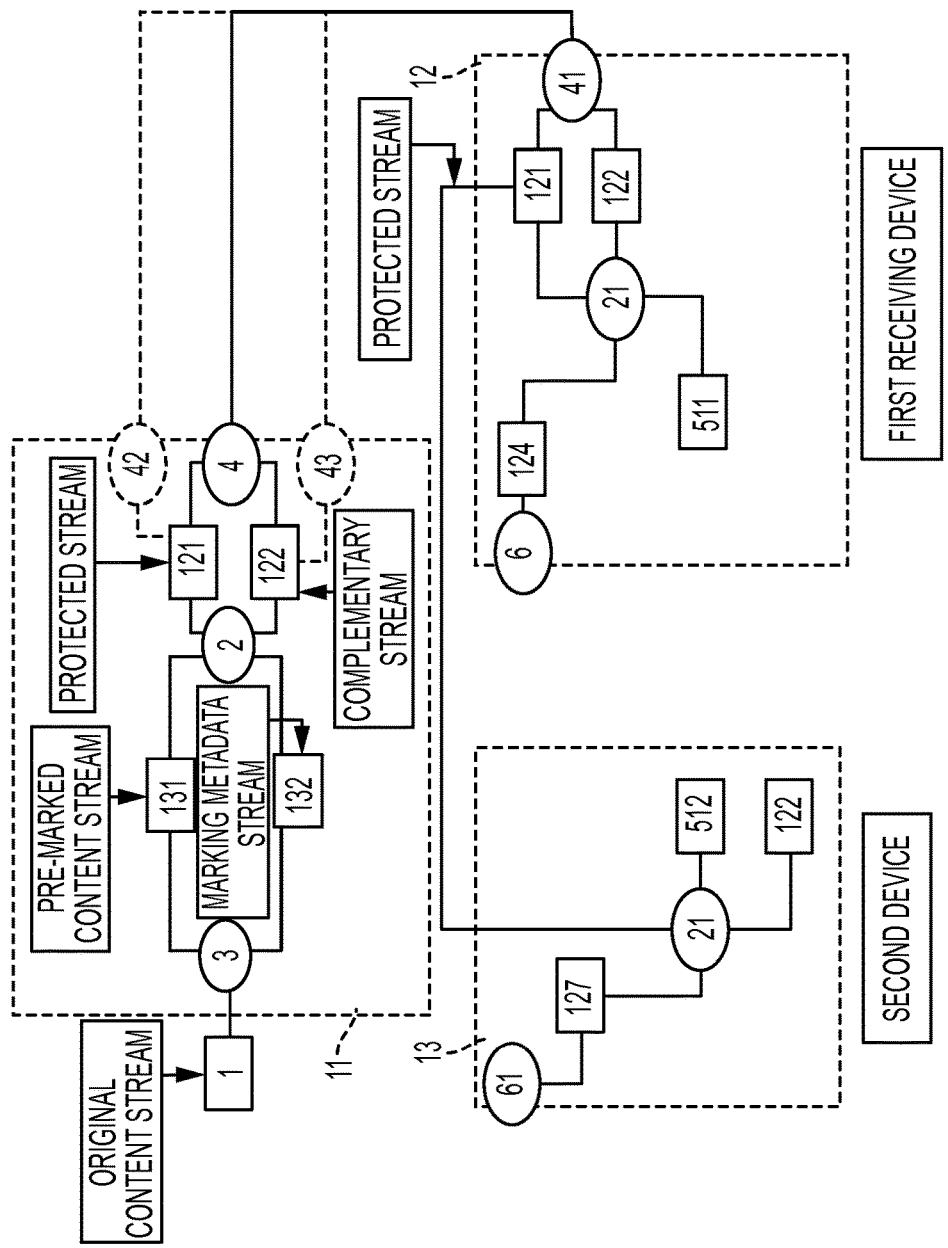

FIG. 1B is a structured view of an alternative protection system. The difference from the protection system presented within the FIG. 1A is that the original content stream 1 is processes by the pre-marking module 3, and not by the scrambling module 2.

The pre-marking module 3 analyses the original content stream 1 and generates 2 streams: a pre-marked content stream 131, having the same audiovisual representation as the original content stream 1, and a marking metadata stream 132 comprising the information needed to generate marked contents 124 and 127 from the pre-marked content stream 131 in function of a first mark 511, respectively a second mark 512.

According to one aspect, the pre-marked content stream 131 and the marking metadata stream 132 are generated as described in WO 99/65241, the subject matter of which is incorporated herein by reference.

The pre-marked content stream 131 and the marking metadata stream 132 are processed by the scrambling module 2 to generate a protected stream 121 and a complementary stream 122 that comprises the information needed by a descrambling component 21 to generate marked contents 124 and 127 from the protected stream 121 in function of a first mark 511, respectively, a second mark 512.

Figure 3B:
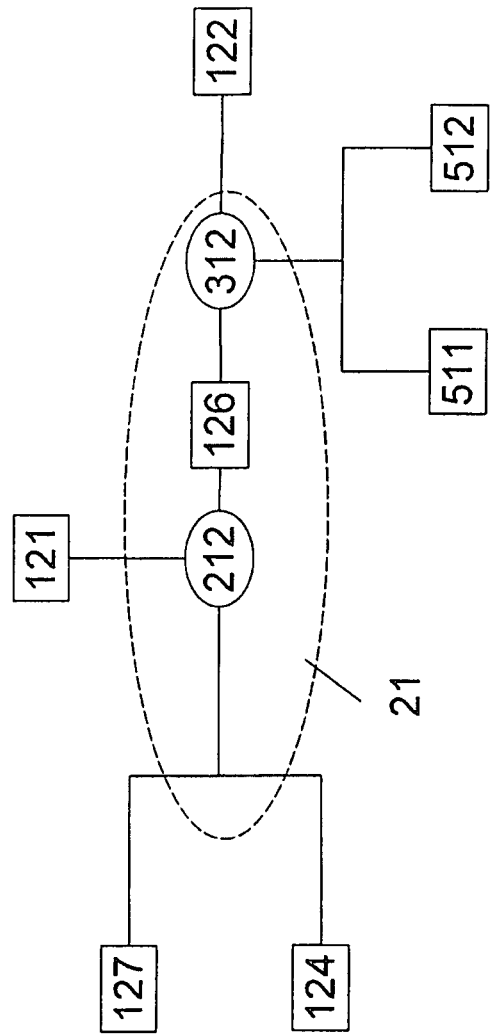

The protected stream 121 and then complementary stream 122 are then processed on the receiving device 12 by the descrambling module 21 to generate the first marked content 124 in function of a first mark 511. The functions of the descrambling module 21 will be described later (FIG. 3B).

Figure 2A:
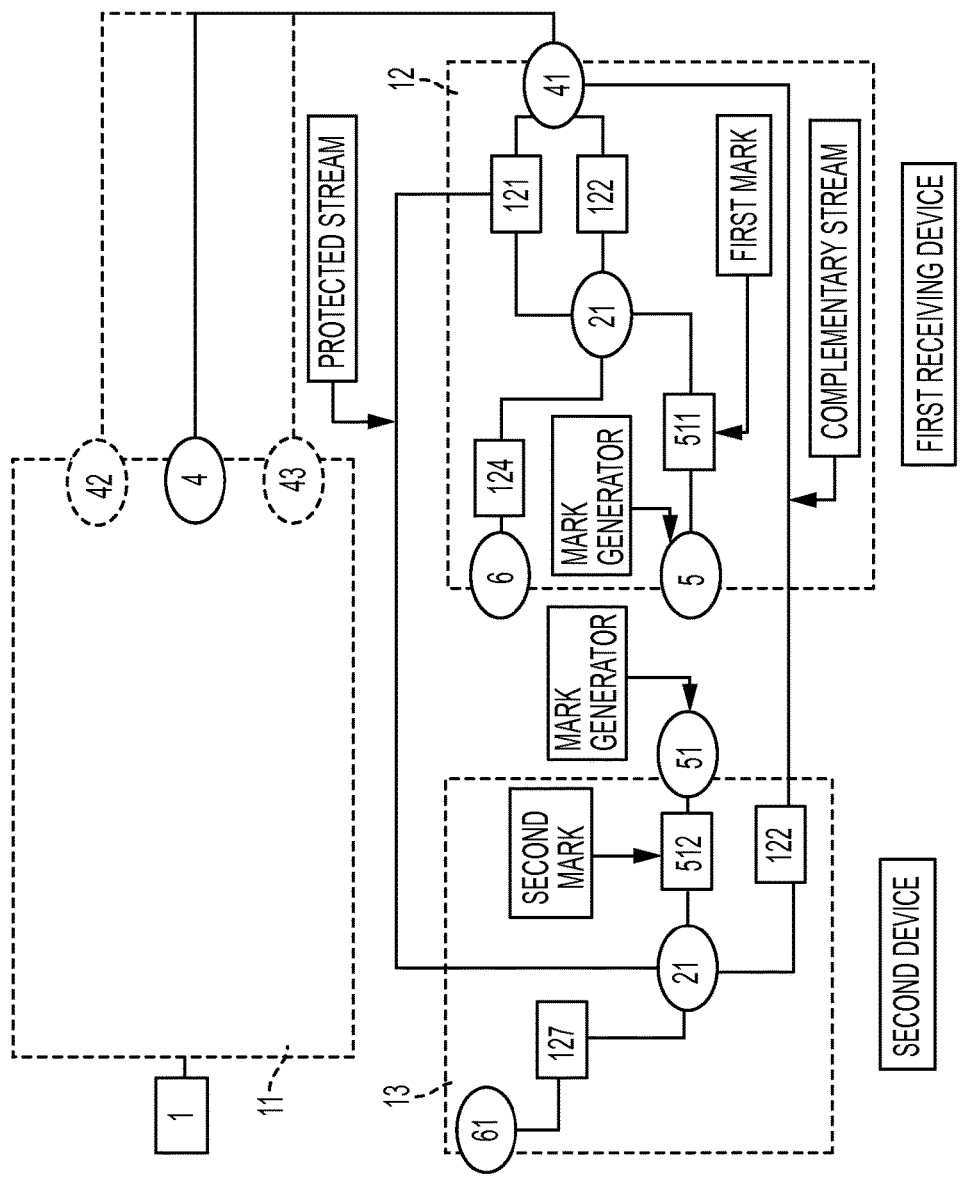
FIGS. 2A, 2B and 2C show the detailed client side of a multicast system to securely deliver multimedia content presented in FIGS. 1A and 1B.

FIG. 2A details the functioning of the receiving device 12 and the second device 13 while processing the protected content 121 and the complementary stream 122 generated as described by FIGS. 1A and 1B.

The first mark 511 is generated by a mark generator 5.

The mark generator 5 is a SIM card, secure USB device or any other secure hardware/software component capable to securely store a unique identifier to generate the first mark 511.

The first mark 511 comprises a value allowing the unique identification of the receiving device 12 (e.g., SIM card ID), one of the hardware/software components of the receiving device 12 (e.g., a built-in value in a chipset). In addition, the first mark 511 may comprise an identifier of one of the operations related to the protected content 121 (e.g., the date/time of the consumption of the protected content stream 121, the acquisition/reception of the protected content stream 121, etc.).

The complementary stream 122 is transmitted form the receiving device 12 to the second device 13 to allow the consumption of the protected content stream 121 on the second device 13.

The complementary stream 122 is transmitted from receiving device 12 to the second device 13 by a direct-connection (e.g., USB connection), network transport (e.g., wireless or wired) or by any other external storage medium (e.g., external hard-disk, flash disk, USB key or CD/DVD).

According to one aspect, the transmission of the complementary stream 122 from receiving device 12 to the second device 13 is protected by various well known cryptographic means.

The second mark 512 is generated by a mark generator 51.

The mark generator 51 is a SIM card, secure USB device or any other secure hardware/software component capable to securely store a unique identifier to generate the first mark 512.

The second mark 512 comprises a value allowing the unique identification of the second device 13 (e.g., SIM card ID), one of the hardware/software components of the second device 13 (e.g., a built-in value in a chipset). In addition, the second mark 512 may comprise an identifier of one of the operations related to the protected content 121 (e.g., the date/time of the consumption of the protected content stream 121, the acquisition/reception of the protected content stream 121, etc.).

Figure 2B:
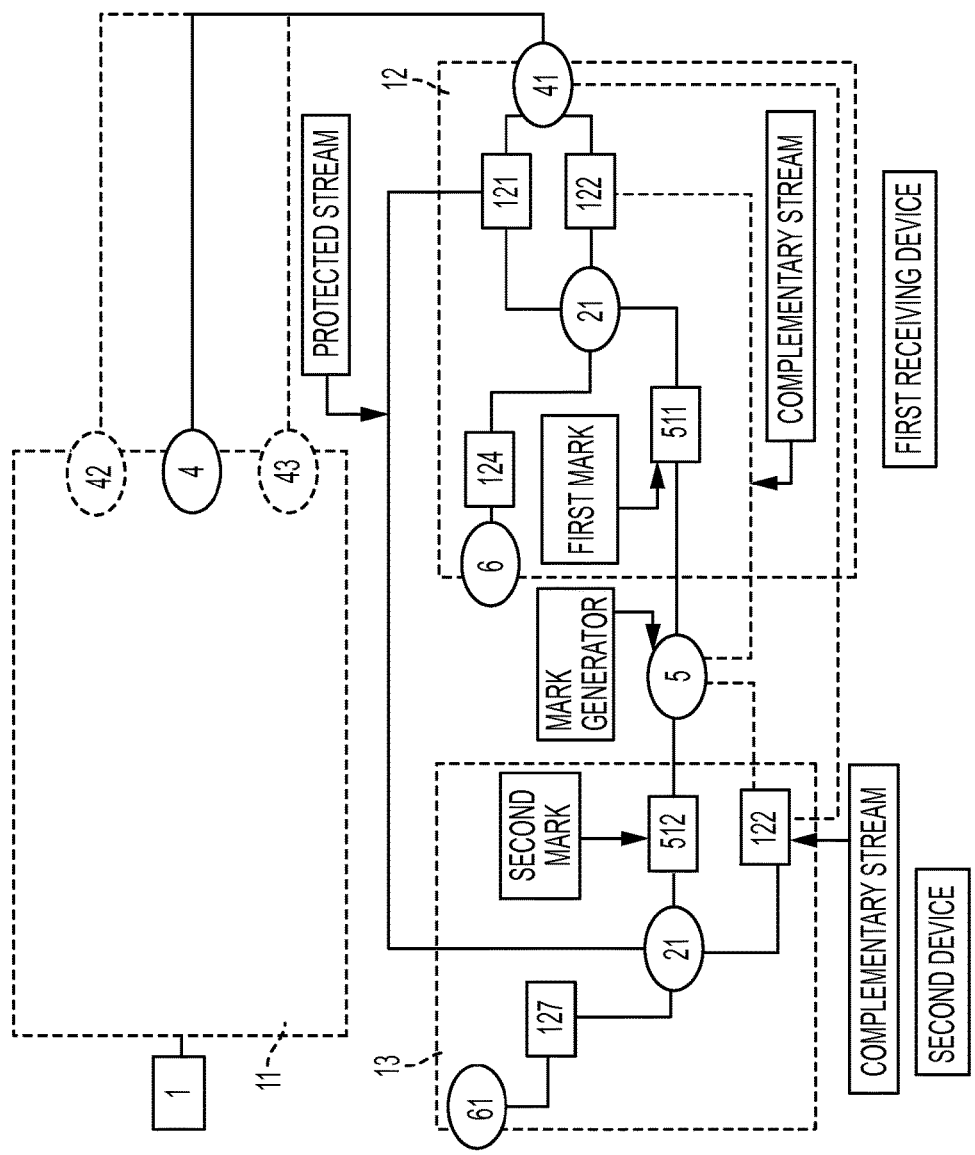

FIG. 2B details an alternative functioning of the receiving device 12 and the second device 13 while processing the protected content 121 and the complementary stream 122 generated as described by FIGS. 1A and 1B. The difference between this structure and the one presented in FIG. 2A is that the same mark generator 5 generates both marks: the first mark 511 and the second mark 512.

According to one aspect, complementary stream 122 is transmitted from receiving device 12 to the second device 13 using the mark generator 5. In this situation, the mark generator 51 is a SIM card, secure USB device or any other secure hardware/software component capable to securely read/write/store binary data.

According to one aspect, the mark generator 5 comprises means of authentifying the receiving device 12 and/or the second device 13 to guarantee a secure transmission of the complementary stream 122 from receiving device 12 to the second device 13.

Figure 2C:
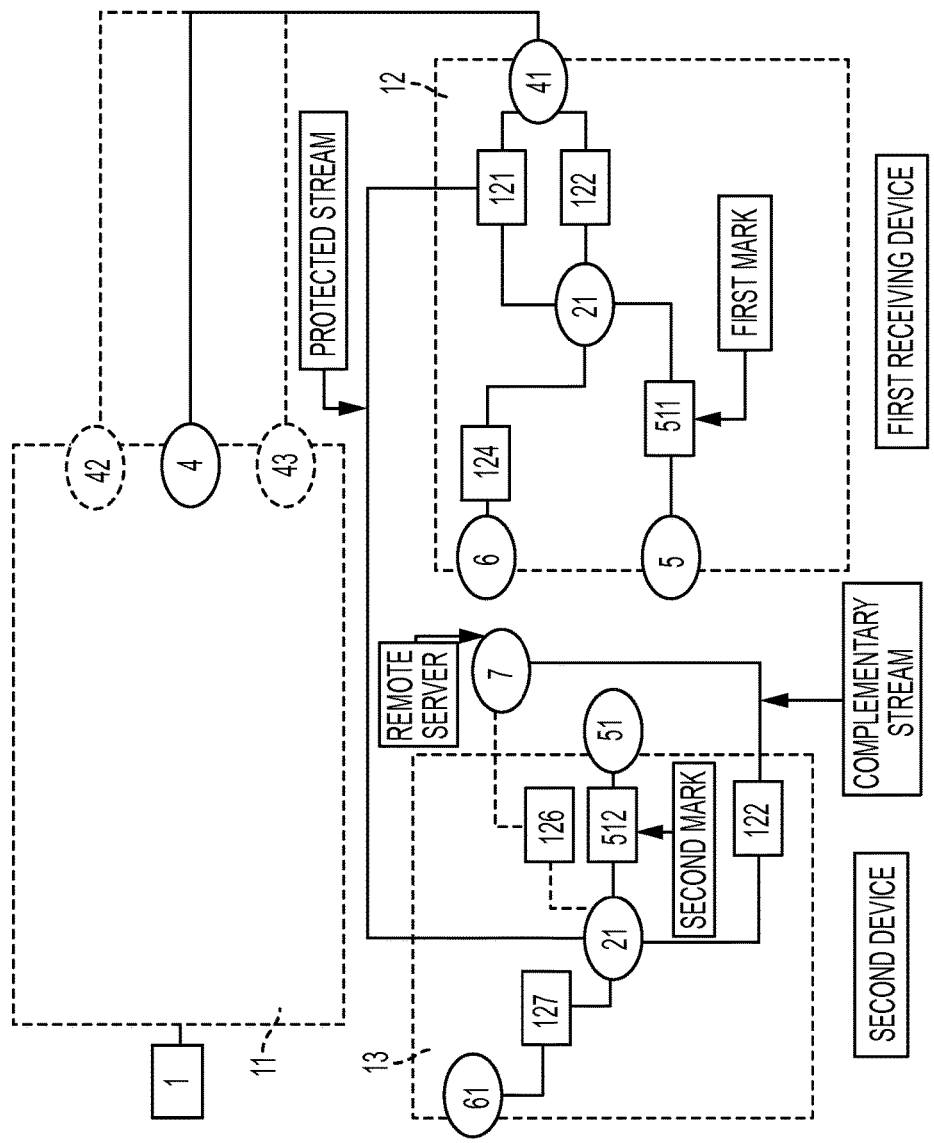

FIG. 2C details an alternative functioning of the receiving device 12 and the second device 13 while processing the protected content 121 and the complementary stream 122 generated as described by FIGS. 1A and 1B. The difference between this structure and the ones presented in FIGS. 2A and 2B is that the complementary stream 122 or the complementary marked stream 126 is transmitted from a remote server 7 to the second device 13.

Figure 3C:
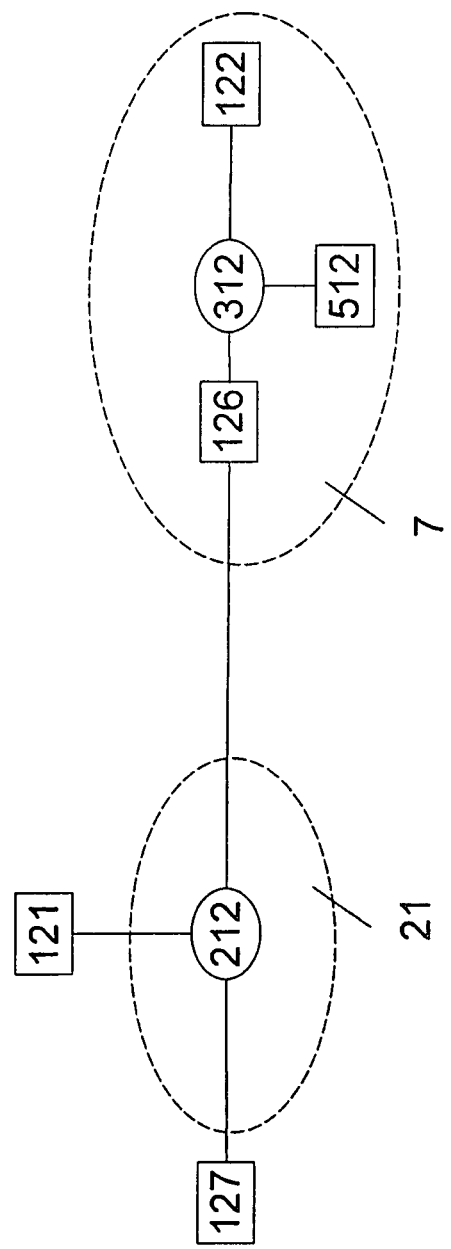

The complementary marked stream 126 is generated from the complementary stream 122 and the second mark 512 and it comprises the information needed to generate the second marked stream 127 from the protected content stream 121. The generation of complementary marked stream 126 will be described later (FIG. 3C).

According to one aspect, the complementary marked stream 126 is generated as described in WO 2008/081113, the subject matter of which is incorporated herein by reference.

According to one aspect, both second device 13 and remote server 7 comprise well known cryptographic means to guarantee the secure transmission of the complementary stream 122 from remote server 7 to the second device 13.

According to another aspect, the mark generator 5 or 51 participates into the process of protection of the transmission of the complementary stream 122 or the complementary marked stream 126 from remote server 7 to the second device 13. The roles played in this process are: securely store the information used by the authentication process (e.g., SIM card ID) between the second device 13 and the remote server 7 and/or to encrypt/decrypt messages exchanged between the second device 13 and the remote server 7.

FIG. 3A highlights the different steps that the descrambling device 21 performs to generate a marked content 124 or 127 from the protected content stream 121 and the complementary stream 122 in function of the first mark 511 or the second mark 512.

The descrambling device 21 performs the following steps:
  descrambling 211 the protected content stream 121 using the information contained in the complementary stream 122 by generating a clear content stream 125 with similar visual and audible representation as the original content 1;
  marking 311 the clear content stream 125 by generating a marked content 124 or 127 in function of the first mark 511, respectively the second mark 512.

According to one aspect, the descrambling step 211 uses decryption keys contained in the complementary stream 122 to decrypt protected content stream 121 to the clear content stream 125, where the decryption algorithms are the ones well-known by the skilled man.

According to another aspect, the descrambling step 211 uses the original parts of the original content stream 1 contained in the complementary stream 122 to insert it back into the protected content stream 121 to obtain the clear content stream 125.

According to another aspect, the insertion of the original parts back into the protected content stream 121 replaces the dummy ones inserted by the scrambling module 2.

According to one aspect, the marking step 311 of the clear content stream 125 uses information comprised in the complementary stream 122.

According to one aspect, the marking step 311 of the clear content stream 125 is done over an encoded or decoded form of the clear content stream 125 using marking technologies well-known by the skilled man.

According to another aspect, the marking step 311 of the clear content stream 125 is done as described in WO '241.

FIG. 3B highlights the different steps that an alternative descrambling device 21 performs to generate a marked content 124 or 127 from the protected content stream 121 and the complementary stream 122 in function of the first mark 511 or the second mark 512.

The descrambling device 21 performs the following steps:
marking 312 the complementary stream 122 using the first mark 511 or the second mark 512 by generating a marked complementary stream 126;
descrambling 212 the protected content stream 121 using the information contained in the marked complementary stream 126 by generating a marked content 124 or 127.

According to one aspect, the marked complementary stream 126 is generated during the marking step 312 as described in WO '113.

According to another aspect, the complementary stream 122 contains the original parts form the original content stream 1 extracted by the scrambling module 2 and replaced with dummy data in the protected content stream 121, as described for example in WO 2005/032135, the subject matter of which is incorporated herein by reference. The complementary stream 122 contains the data from the marking metadata stream 132, as disclosed in FIG. 1B. The marking metadata stream 132 is generated as described in WO '241. The marking step 312 generates a marked complementary stream 126 as following:
some marked parts of the marking metadata stream 132 are chosen to be inserted into the audiovisual content in function of the first mark 511 or the second mark 512, as described in WO '241;
the marked complementary stream 126 is generated by mixing together the chosen marked parts from the marking metadata stream 132 with the original parts of the original content stream 1 comprised in the complementary stream 122.

The format of the marked complementary stream 126 is the format of the marking metadata stream 132, the format of the complementary stream 122 or any other format, proprietary or standard.

The descrambling step 212 generates the mark content stream 124 or 127 by inserting the all content parts comprised in the marked complementary stream 126 (marked and original) into the protected content stream 121. This step can be implemented for example like in WO '113.

FIG. 3C highlights the different steps that an alternative descrambling device 21 performs to generate a marked content 127 from the protected content stream 121 in function of the second mark 512. The difference between this embodiment and the one presented in FIG. 3B is that only the descrambling step 212 is executed by the descrambling module 21 on the second device 13, while the marking step 312 is applied remotely by a remote server 7. In this case, only the marked complementary stream 126 is transmitted between from the remote server 7 to the second device 13.

The invention claimed is:

1. A method for secure distribution of original audiovisual stream content to a plurality of consumer devices through a multicast session at least one consumer device, the method comprising:
generating, by a server, protected content from the original content by replacing at least one part of original data in the original content with different data;
generating, by the server, a complementary information comprising digital information suitable to allow reconstruction of content from the protected content, the complementary information containing the at least one part of the original data replaced by the different data in the protected content;
transmitting, by the server, the protected content and the complementary information to a receiving consumer device;
calculating, by one or more mark generators, a first mark and a second mark, the first mark being calculated as a function of a unique identifier of the receiving consumer device or an external secure device, the second mark being calculated as a function of a unique identifier of a second device, the external secure device or a consumer using the second device, the one or more mark generators being only connected to at least one of the receiving consumer device and the second device;
reconstructing, on the receiving consumer device, first marked content from the protected content as a function of the first mark and the complementary information;
transmitting, by the receiving consumer device, the protected content to the second device, without marking the protected content with the first mark;
receiving, by the second device, the complementary information from the receiving consumer device or an external device such that the complementary information received at the second device does not include the first mark; and
reconstructing, on the second device, second marked content from the protected content received from the receiving consumer device as a function of the second mark and the received complementary information, such that the second marked content does not include the first mark.

2. The method in accordance with claim 1, wherein generating the protected content uses cryptographic algorithms.

3. The method in accordance with claim 2, wherein generating the protected content uses specifications according to ETR-289.

4. The method in accordance with claim 1, wherein the protected content has a same format as the original content.

5. The method in accordance with claim 1, wherein the complementary information is transmitted from the receiving consumer device to the second device using a direct-connection link.

6. The method in accordance with claim 1, wherein the external device includes the external secure device and the complementary information is transmitted from the receiving consumer device to the second device using the external secure device.

7. The method in accordance with claim 1, wherein the external device includes a remote server and the complementary information is transmitted from the remote server to the second device using a network connection.

8. The method in accordance with claim 1, wherein the one or more mark generators includes a mark generator on the receiving consumer device, the first mark being generated by the mark generator on the receiving consumer device.

9. The method in accordance with claim 1, wherein the one or more mark generators includes the external secure device, the first mark being generated on the external secure device and transmitted to the receiving consumer device using a direct-connection link.

10. The method in accordance with claim 1, wherein the one or more mark generators includes a mark generator on the receiving consumer device, the second mark being generated by the mark generator on the receiving consumer device and transmitted to the second device using a direct-connection link.

11. The method in accordance with claim 1, wherein the one or more mark generators includes a mark generator on the receiving consumer device, the second mark being generated by the mark generator on the receiving consumer device and transmitted to the second device using the external secure device.

12. The method in accordance with claim 1, wherein the one or more mark generators includes the external secure device, the second mark being generated on the external secure device and transmitted to the second device using a direct-connection link.

13. The method in accordance with claim 1, wherein the one or more mark generators includes a mark generator on the second device, the second mark being generated by the mark generator on the second device.

14. The method in accordance with claim 1, wherein at least one of the transmission and storage of the complementary information is protected by cryptographic means.

15. The method in accordance with claim 1, the method further comprising, prior to generating the protected content:
generating a pre-marked content stream having audiovisual content of the original content and a marking metadata stream comprising information to generate marked content from the pre-marked content stream,
wherein the protected content is generated from the pre-marked content stream and the complementary information is generated from the marking metadata stream.

16. A system for secure distribution of original content to a plurality of consumer devices at least one consumer device, the system comprising:
a server configured to: generate protected content from the original content by replacing at least one part of original data in the original content with different data, generate complementary information comprising digital information suitable to allow reconstruction of content from the protected content, and transmit the protected content and the complementary information, said complementary information containing the at least one part of the original data. replaced by the different data in the protected content;
a receiving consumer device configured to receive the protected content and the complementary information transmitted by the server;
a second device; and
one or more mark generators only connected to at least one of the receiving consumer device and the second device, the one or more mark generators configured to calculate a first mark and a second mark, the first mark being calculated as a function of a unique identifier of the receiving consumer device or an external secure device, the second mark being calculated as a function of a unique identifier of the second device, the external secure device or a consumer using the second device;
wherein the receiving consumer device is configured to calculate first marked content from the protected content as a function of the first mark and the complementary information;
wherein the receiving consumer device is configured to transmit the protected content to the second device, without marking the protected content with the first mark;
wherein the second device is configured to receive the complementary information from the receiving consumer device or an external device such that the complementary information received at the second device does not include the first mark; and wherein the second device is configured to calculate second marked content from the protected content received from the receiving consumer device as a function of the second mark and the received complementary information, such that the second marked content does not include the first mark.

17. The system in accordance with claim 16, further comprising a scrambling device including a cryptographic algorithm that generates the protected content.

18. The system in accordance with claim 16, wherein the external device includes the external secure device that transmits the complementary information from the receiving consumer device to the second device.

19. The system in accordance with claim 16, wherein the external device includes a remote server that transmits the complementary information to the second device.

20. The system in accordance with claim 16, wherein the external secure device stores at least one of the first mark and the second mark.

21. The system in accordance with claim 16, wherein the one or more mark generators includes the external secure device, the external secure device transmitting at least one of the first mark to the receiving consumer device and the second mark to the second device.

22. The system in accordance with claim 16, wherein the receiving consumer device is a computer, a set-top-box, a media center, a mobile phone, a PDA, a portable media player or a hardware device with multimedia capabilities.

23. The system in accordance with claim 16, wherein the second device is a computer, a set-top-box, a media center, a mobile phone, a PDA, a portable media player or a hardware device with multimedia capabilities.

24. The system in accordance with claim 16, wherein the external secure device is a SIM card, a secure USB device, at least one of a secure hardware component or a secure software component that securely stores and transmits at least one of the unique identifier associated with the first mark and the unique identifier associated with the second mark.

25. The system in accordance with claim 16, further comprising a USB connection, a wireless network, a wired network, an external hard-disk, a flash disk, an USB key, a CD device or a DVD device that allows transfer of at least one of the protected content and the complementary information.

26. The system in accordance with claim 16, wherein the server is configured to:
generate a pre-marked content stream having audiovisual content of the original content and a marking metadata stream comprising information to generate marked content from the pre-marked content stream,
wherein the protected content is generated from the pre-marked content stream and the complementary information is generated from the marking metadata stream.

* * * * *